(12) United States Patent
Yamada et al.

(10) Patent No.: US 12,053,968 B2
(45) Date of Patent: Aug. 6, 2024

(54) METHOD FOR EVALUATING LAMINATE, DEVICE FOR EVALUATING LAMINATE, METHOD FOR MANUFACTURING LAMINATE, AND DEVICE FOR MANUFACTURING LAMINATE

(71) Applicant: ZF Automotive Germany GmbH, Alfdorf (DE)

(72) Inventors: Yosuke Yamada, Osaka (JP); Hideki Yamasaki, Osaka (JP); Toru Tagami, Osaka (JP)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/596,769

(22) PCT Filed: Jan. 21, 2020

(86) PCT No.: PCT/JP2020/001894
§ 371 (c)(1),
(2) Date: Dec. 17, 2021

(87) PCT Pub. No.: WO2021/009944
PCT Pub. Date: Jan. 21, 2021

(65) Prior Publication Data
US 2022/0314596 A1    Oct. 6, 2022

(30) Foreign Application Priority Data
Jul. 17, 2019    (JP) .................. 2019-132201

(51) Int. Cl.
*B32B 41/00*    (2006.01)
*B32B 37/00*    (2006.01)
*G01N 21/892*    (2006.01)

(52) U.S. Cl.
CPC ............. *B32B 41/00* (2013.01); *B32B 37/003* (2013.01); *G01N 21/892* (2013.01); *B32B 2305/18* (2013.01); *B32B 2367/00* (2013.01)

(58) Field of Classification Search
CPC ... B32B 41/00; B32B 37/003; B32B 2305/18; B32B 2367/00; B32B 37/20;
(Continued)

(56) References Cited

U.S. PATENT DOCUMENTS

2002/0041941 A1    4/2002 Ritter
2007/0115462 A1    5/2007 Daul
(Continued)

FOREIGN PATENT DOCUMENTS

EP    1044803    10/2000
EP    2415633 A1 * 2/2012 ........... B60N 2/5883
(Continued)

OTHER PUBLICATIONS

International Search Report of Int. Appl. No. PCT/JP2020/001894 dated Apr. 14, 2020.
(Continued)

*Primary Examiner* — Michael N Orlando
*Assistant Examiner* — Joshel Rivera
(74) *Attorney, Agent, or Firm* — IPUSA, PLLC

(57) ABSTRACT

A method of evaluating a laminate formed of two or more layers bonded to each other includes an image obtaining step of obtaining a two-dimensional image of the laminate; a detecting step of detecting air-pocket corresponding regions from a two-dimensional image; a characteristic value obtaining step of determining a characteristic value related to areas of the air-pocket corresponding regions; and an evaluation step of evaluating the laminate based on the characteristic value. is a method of evaluating a laminate.

10 Claims, 12 Drawing Sheets

(58) Field of Classification Search
CPC .............. B32B 2307/406; B32B 27/08; B32B 2262/0276; B32B 2437/00; B32B 27/12; B32B 5/024; B32B 37/203; B32B 2553/00; B32B 2605/08; G01N 21/892; G01N 21/8914; G01N 2021/8438; G01N 2021/8472; G01N 2021/8887; G01N 2203/0091; G01N 19/04
USPC .................... 156/60, 64, 350, 351, 378, 379
See application file for complete search history.

(56) References Cited

U.S. PATENT DOCUMENTS

| | | | |
|---|---|---|---|
| 2016/0139324 A1* | 5/2016 | Yagi | G02B 6/0051 362/624 |
| 2016/0161246 A1* | 6/2016 | Chen | B60R 21/2165 348/46 |
| 2017/0284943 A1 | 10/2017 | Ghosh et al. | |
| 2019/0091985 A1 | 3/2019 | Kadowaki et al. | |

FOREIGN PATENT DOCUMENTS

| | | |
|---|---|---|
| JP | H06-201610 | 7/1994 |
| JP | H10-244626 | 9/1998 |
| JP | 2006-521544 | 9/2006 |
| JP | 2008-150754 | 7/2008 |
| WO | 2017/155113 | 9/2017 |

OTHER PUBLICATIONS

Office Action mailed on Aug. 1, 2023 with respect to the corresponding Japanese patent application No. 2019-132201.
Office Action mailed on Nov. 14, 2023 with respect to the corresponding Japanese patent application No. 2019-132201.

* cited by examiner

METHOD FOR EVALUATING LAMINATE, DEVICE FOR EVALUATING LAMINATE, METHOD FOR MANUFACTURING LAMINATE, AND DEVICE FOR MANUFACTURING LAMINATE

TECHNICAL FIELD

The present disclosure relates to a method of evaluating laminates, an evaluation device of laminates, a method of manufacturing laminates, and a manufacturing device of laminates.

BACKGROUND ART

In applications such as airbags for vehicles, outdoor goods, clothing, and the like, a laminate has been known in which multiple layers formed of sheet-like materials are bonded. For example, Patent Document 1 discloses a fiber material of gas bags in which a thin film of an airtight material is applied to the wall portion of a fabric layer 14 over the entire surface.

RELATED ART DOCUMENTS

Patent Documents

Patent Document 1: European Laid-Open Patent Application No. 1044803

SUMMARY OF THE INVENTION

Problem to be Solved by the Invention

It is often the case that high quality is required for such applications of laminates as represented by gas bags (airbags) described above disclosed in Patent Document 1. Therefore, there has been demand for an accurate and simple method of evaluating various characteristics related to the quality of laminates. For example, it is often the case that high strength is required for laminates, and as the strength of a laminate depends largely on the bond strength and the like of layers that constitutes the laminate, an accurate and simple method of evaluating characteristics such as the bond strength has been desired.

However, many of the conventional methods of evaluating laminates formed of two bonded layers are cumbersome. For example, the bond strength of a laminate formed of two bonded layers has been evaluated in practice by measuring the load applied upon peeling one layer from the other layer (peel force). Such conventional methods require a mechanical means that breaks the laminate (in the example of evaluating the bond strength described above, the means of peeling the layers off from each other), and in many cases, the procedure becomes complicated.

In view of the points described above, according to one aspect of the present invention, a problem to be solved is to evaluate a laminate formed of two or more bonded layers accurately and simply.

Means for Solving Problem

In order to solve the problem described above, one aspect of the present invention is a method of evaluating a laminate formed of two or more layers bonded to each other that includes an image obtaining step of obtaining a two-dimensional image of the laminate; a detecting step of detecting air-pocket corresponding regions from a two-dimensional image; a characteristic value obtaining step of determining a characteristic value related to areas of the air-pocket corresponding regions; and an evaluation step of evaluating the laminate based on the characteristic value.

Advantageous Effects of the Invention

According to one aspect of the present invention, a laminate formed of two or more bonded layers can be evaluated accurately and simply.

EMBODIMENTS FOR CARRYING OUT THE INVENTION

Figure 1:
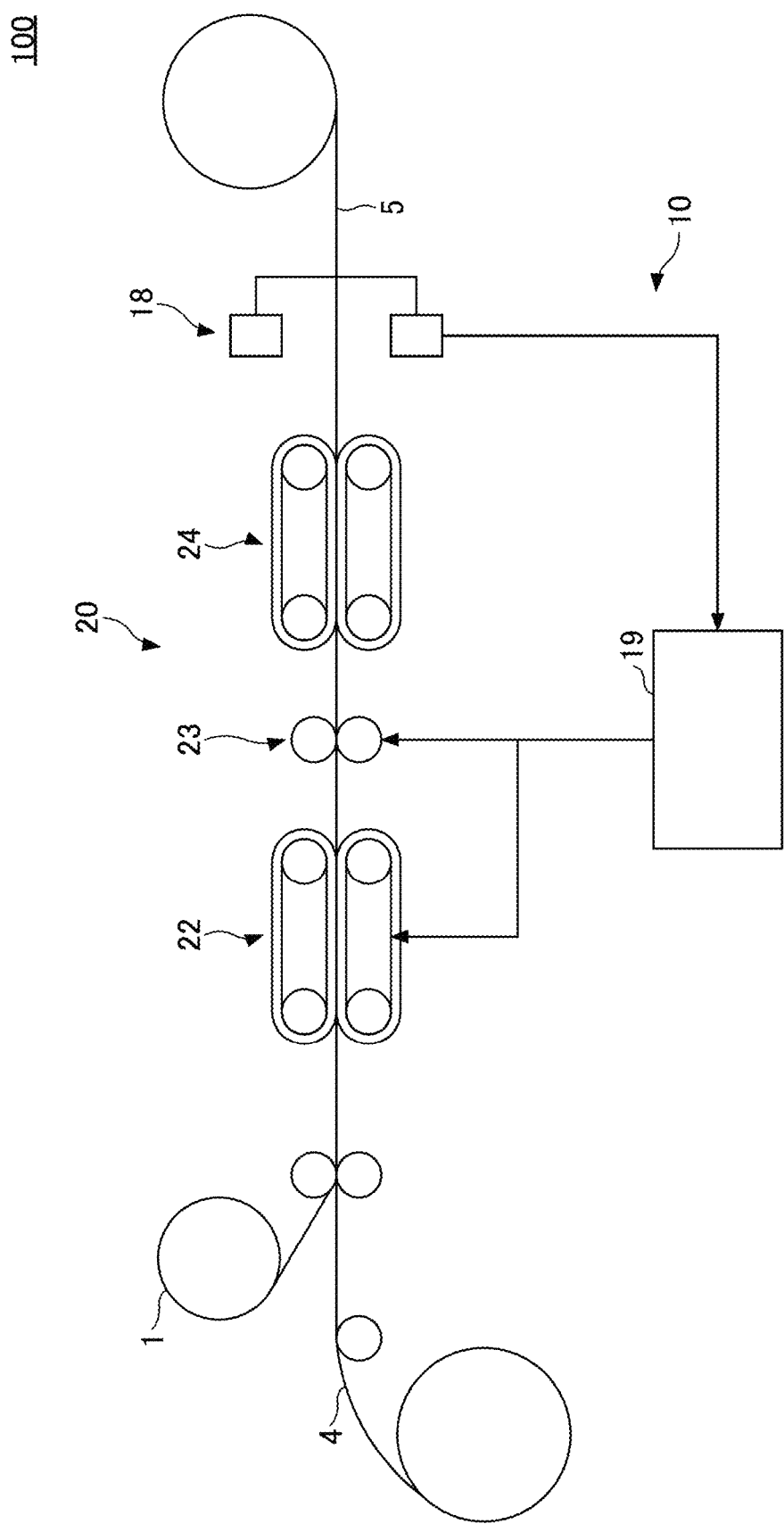
FIG. 1 is a schematic diagram of a manufacturing device of laminates according to one embodiment of the present invention.

One embodiment of the present invention is a method of evaluating a laminate, which is a method of evaluating a laminate formed of two or more layers bonded to each other that includes an image obtaining step of obtaining a two-dimensional image of the laminate; a detecting step of detecting air-pocket corresponding regions from a two-dimensional image; a characteristic value obtaining step of determining a characteristic value related to areas of the air-pocket corresponding regions; and an evaluation step of evaluating the laminate based on the characteristic value.

Also, another embodiment of the present invention is a device that evaluates laminates, which is a device that evaluates a laminate formed of two or more layers bonded to each other, including an image obtaining unit configured to obtain a two-dimensional image of the laminate; a detection unit configured to detect air-pocket corresponding regions from a two-dimensional image; a characteristic value obtaining unit configured to determine a characteristic value related to areas of the air-pocket corresponding regions; and an evaluation unit configured to evaluate the laminate based on the characteristic value.

A laminate as an object to be evaluated in the present embodiment has a sheet-like structure formed of two or more bonded layers. It is favorable that at least one of the two or more layers constituting the laminate has flexibility, and favorable that all layers have flexibility. Also, it is favorable that the laminate as a whole has flexibility and airtightness. The laminate can have a configuration in which, for example, one of the two or more layers is a base fabric, and another layer is a polymer layer. In this case, it is favorable that the base fabric is the outermost layer of the laminate (the topmost surface layer or the backmost surface layer). The laminate in the present embodiment is suitably used in applications such as airbags for vehicles, outdoor goods, clothing, and packaging materials, and in particular, suitably used as a material for airbags for vehicles.

In the case where a base fabric and a polymer layer are bonded to form a laminate, the base fabric has a function of serving as a support to ensure the strength of the laminate. The base fabric has a sheet-like structure including fibers, and may be a fabric, knit, nonwoven fabric, or the like. The base fabric may be sewn entirely or partially. The types of fibers included in the base fabric is not limited in particular; synthetic fiber, natural fiber, regenerated fiber, semisynthetic fiber, inorganic fiber, and combinations of these (including mixed fibers and mixed woven fabrics) may be used.

Meanwhile, the polymer layer is a layer primarily including polymers and having flexibility, and favorably a layer that imparts airtightness to the laminate to be formed, upon being bonded with the base fabric. The polymer to be used is not limited in particular, and includes resins, rubbers, what-is-called elastomers, and the like.

In the case where the laminate is formed of two layers, it may be manufactured, for example, by preparing a base fabric and a polymer layer separately, stacking these to be overlaid vertically, and executing heating and/or pressurization so as to be bonded to each other. At this time, at least part of the base fabric and/or the polymer layer may be melted or softened to bond both layers. Upon bonding both layers, an adhesive may be used supplementally. Also, the laminate may have the two layers bonded by an adhesive, without heating and/or pressurization. In the case of a laminate formed of three or more bonded layers, the manufacturing steps described above are substantially the same.

FIG. 1 illustrates an example of a manufacturing device 100 of laminates, and a bonding device 20 included in this manufacturing device 100. FIG. 1 illustrates an example where a laminate is prepared by bonding a base fabric with a polymer layer. In other words, in the bonding device 20, a base fabric 4 and a polymer layer 1 each wound in advance are unwound, overlaid, and conveyed, to be bonded in the bonding device 20. The overlaid base fabric 4 and the polymer layer 1 are heated and/or pressurized in the bonding device 20, by a heater 22 and a pressurizing unit 23 (a nip roll or the like). Note that in the illustrated example, although the heater 22 and the pressurizing unit 23 are configured separately, heating and pressurization can also be executed by the same member.

The laminate may be manufactured by a method other than that described above. The laminate may be manufactured by supplying a polymer layer formed to have a sheet shape by extrusion molding by an extruder and being in a soft state before cooling, onto a base fabric to be overlaid, and executing heating and/or pressurization as necessary. Alternatively, the laminate may be manufactured by arranging a manufacturing device of the base fabric (a loom or the like) and a manufacturing device of the polymer layer (an extruder or the like) close to each other; supplying the polymer layer immediately after extrusion on the base fabric immediately after manufacturing; and executing heating and/or pressurization as necessary. Further, the laminate may be manufactured, without melting or softening the base fabric and/or the polymer layer, by bonding the base fabric and the polymer layer with an adhesive.

The laminates described above are often applied to final products for which high quality is required; therefore, it is important to accurately and simply evaluate various characteristics of the laminates according to the application. Here, as the various characteristics to be evaluated, resistances and related characteristics with respect to physical or chemical external factors such as pressure, shock, scraping, temperature, humidity, and the like are considered; for example, pressure resistance (more specifically, pressure upon fracturing, retention of internal pressure, or the like), flame resistance, rub fastness, wear resistance, heat resistance, moisture resistance, and weather resistance, and the like may be enumerated. Further, depending on the application of the laminates, strength, in particular, bond strength, internal pressure retention characteristics, air permeability, airtightness, liquid tightness, robustness, long-term reliability, and the like may be evaluated.

However, in conventional methods of evaluating laminates, it has been often the case that a physical or chemical external factor is actually applied to a laminate for evaluation; therefore, an instrument or a device for providing such an external factor is required, and the procedure is complicated or takes a long time. For example, the bond strength between the layers in a laminate is significantly relevant to the quality of a final product manufactured using the laminate, and hence, the evaluation could be particularly important; therefore, accurate and simple evaluation of the bond strength is required. However, the conventional methods of evaluating the bond strength measure the peel force upon peeling the bonded layers (upon breaking the bond between the layers); this method requires a mechanical unit for peeling, and the peeling procedure has been complicated.

Also, as described above, many conventional evaluation methods break laminates; therefore, in the case of increasing the number of samples in order to improve the inspection accuracy, in the quality inspection of the laminate, the efficiency of inspection would decline. Further, it has been also difficult to execute a conventional evaluation in-line, and to feed back the evaluation results to the bonding device. Therefore, while manufacturing laminates, the bonding conditions could not be modified or adjusted to be appropriate.

Under such circumstances, the inventors found a method of evaluating characteristics of a laminate, by obtaining a two-dimensional image of the laminate and analyzing the image. According to the method in the present embodiment, the characteristics of the laminate can be evaluated accurately and simply. Also, the method of the present embodiment allows non-destructive evaluation of the laminate. Further, in-line evaluation can also be executed, and hence, the laminate can be manufactured while feeding back the evaluation results.

In the following, a procedure for evaluating characteristics based on a two-dimensional image of a laminate will be described. In the case where the laminate is formed of, for example, a base fabric and a polymer layer bonded to each other, in the bonded portion between the base fabric and the polymer layer in the laminate, in some cases, the two layers are not fitted tightly, and thereby, the surface of the base fabric and the surface of the polymer layer are separated from each other locally. In other words, there may be cases where portions, in which gas such as air is enclosed between the two layers, are generated. In the present specification, such a portion is referred to as an air pocket or a void. Such air pockets may be formed in the case where there are irregularities on the surface of at least one of the two layers; in the case where at least one of the two layers has flexibility; in the case where the two layers are bonded with a relatively small amount of an adhesive; and the like.

Figure 2:
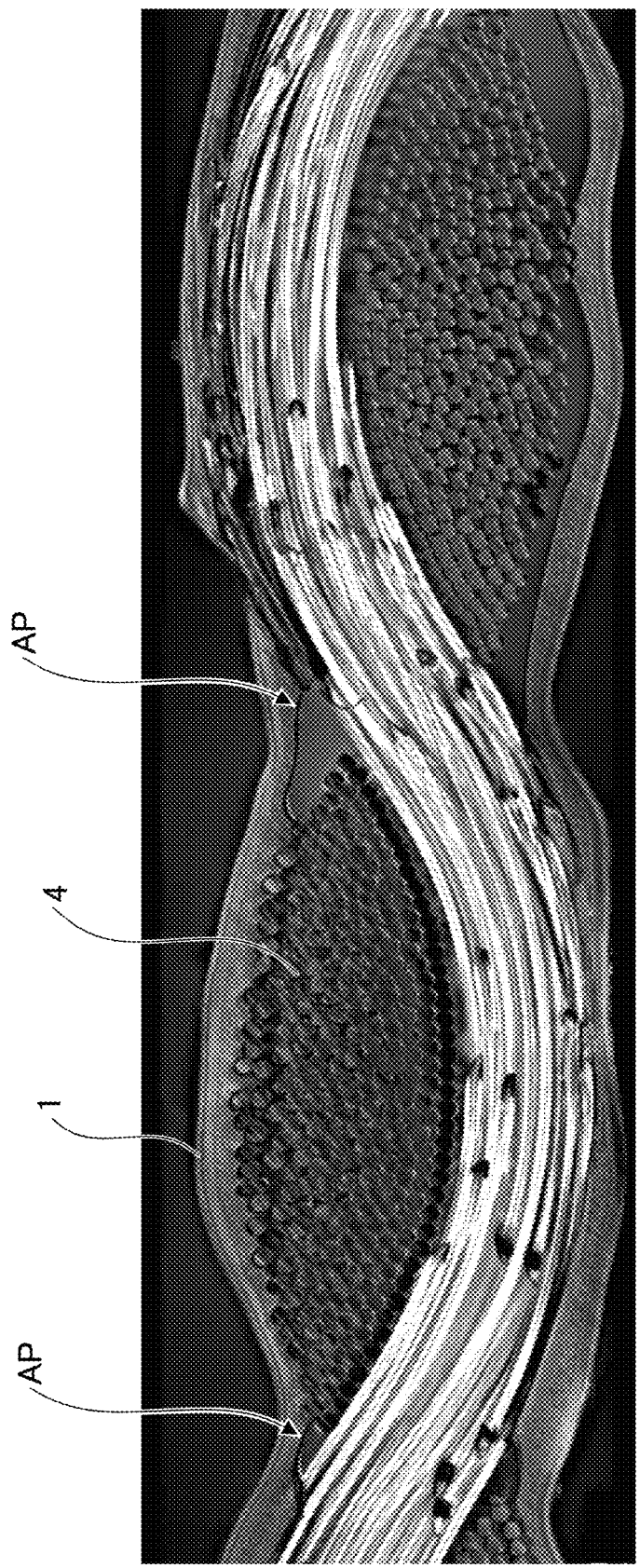
FIG. 2 is a cross-sectional photograph of a laminate including air pockets.

FIG. 2 illustrates, as an example, a cross-sectional photograph in which a laminate formed of a polymer layer and a base fabric bonded to each other, is cut in a direction orthogonal to the surface direction of the laminate (a direction along the surface of the laminate). The laminate in FIG. 2 has a base fabric 4 that is plain-woven such that multiple bundles of single yarns are woven to extend in directions perpendicular to each other, on which a polymer layer 1 is bonded. As illustrated in FIG. 2, in the vicinity of the edges of the fiber bundles of the base fabric 4, regions separated between the base fabric 4 and the polymer layer 1, namely, air pockets AP, are formed.

The inventors found that the presence of such air pockets affected one or more characteristics of the laminate, and that the existence ratio of the air pockets had correlations with one or more characteristics of the laminate. For example, a tendency was found that a smaller existence ratio of air pockets better improves the resistances to physical or chemical external factors, and better improves the characteristics related to such resistances. For example, a tendency was found that a smaller existence ratio of air pockets makes the laminate less likely to burn, and hence, improves the flame resistance. A tendency was found that a smaller existence ratio of air pockets makes the laminate less likely to be peeled off from each other, and hence, improves the wear resistance, the rub fastness, and the like. Also, a tendency was found that a smaller existence ratio of air pockets makes the air permeability smaller. In particular, the inventors found that the existence ratio of air pockets had a good correlation with the bond strength, and that the existence ratio of air pockets had a good correlation with the retention of internal pressure. In addition, by using such correlations, one or more characteristics of the laminate can be determined based on characteristic values that are obtained by obtaining a two-dimensional image of the laminate to detect regions corresponding to air pockets (also referred to as air-pocket corresponding regions), and determining the characteristic values related to the regions. The air-pocket corresponding regions described above can be easily detected based on optical feature values of the obtained image.

Figure 3:
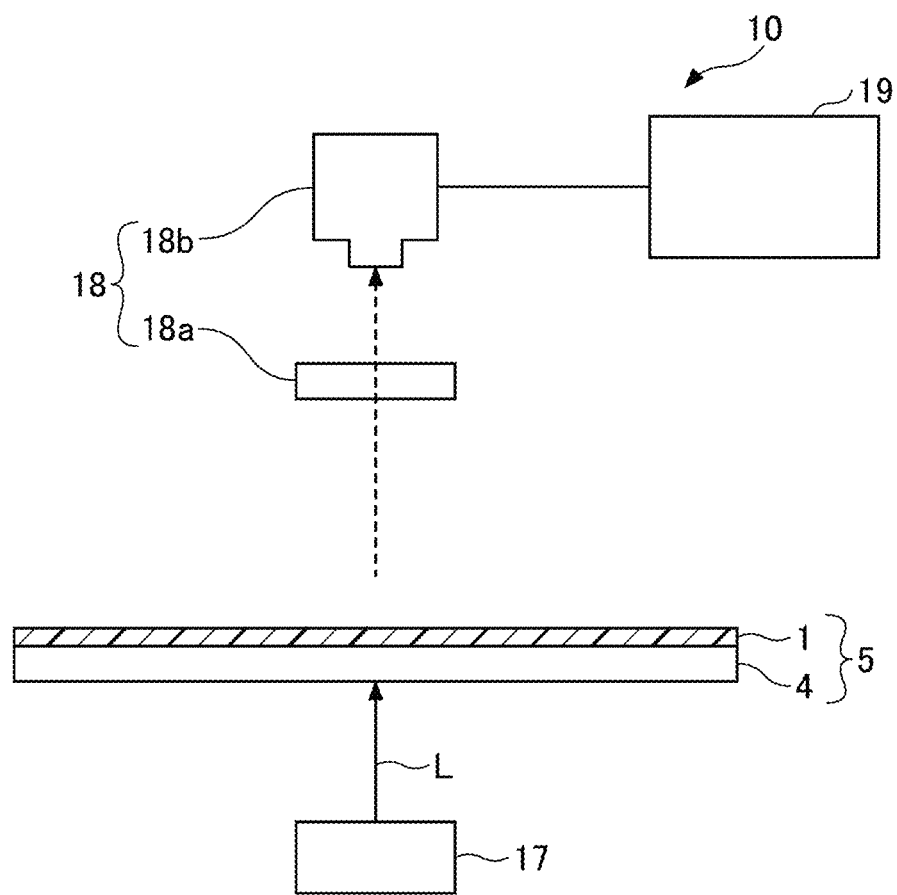
FIG. 3 is a schematic diagram of an evaluation device of laminates according to one embodiment of the present invention.

FIG. 3 illustrates a schematic diagram of an evaluation device 10 used for executing the evaluation method of the present embodiment. The evaluation device 10 illustrated in FIG. 3 is a device capable of obtaining, analyzing, and evaluating a two-dimensional image of a laminate 5 formed of the base fabric 4 and the polymer layer 1 bonded to each other. As illustrated in FIG. 3, the evaluation device 10 is provided with an imaging unit 18 to obtain a two-dimensional image of the laminate 5, and an information processing device 19 connected to the imaging unit 18. The imaging unit 18 is provided with an image magnifying unit 18a to magnify an image of the laminate 5, and a main body of the imaging unit 18b located close to or connected to the image magnifying unit 18a.

As the image magnifying unit 18a, for example, a stereoscopic microscope or a magnifying glass can be used. It is favorable that the image is magnified by a factor of 2 to 50. Also, the main body of the imaging unit 18b may be a digital camera, for example, a CCD camera or a CMOS camera. The image magnifying unit 18a and the main body of the imaging unit 18b may be integrated to be unified.

The imaging unit 18 may be arranged on one side of the laminate 5 (the upper side in the illustrated example). On the other side of the laminate 5, a light source 17 (a light projection unit) can be arranged to project light L toward the laminate 5. With this arrangement, a transmitted image can be captured. Here, in the case where the laminate 5 has two layers different from each other, the image may be captured on either layer side. Note that in the case where the laminate 5 is constituted with a base fabric and a polymer layer, and a transmitted image is to be captured, it is favorable that the image is captured from the polymer layer side because the outlines of air pockets can be captured clearer. Also, the arrangement of the imaging unit 18 and the light source 17 is not limited as illustrated; the light source 17 can also be arranged on the same side as the imaging unit 18 to capture a reflected image. In the case of capturing a reflected image, it is favorable that the light L from the light source 17 is incident on the laminate 5 in an oblique direction, rather than perpendicularly with respect to the surface direction of the laminate 5.

As such, the image captured by the imaging unit 18 may be a reflected image or may be a transmitted image. Both reflected image and transmitted image may be captured, to execute analysis based on both data. Also, regardless of a reflected image or a transmitted image, multiple images can also be captured, to execute analysis based on the multiple images. Further, in the example in FIG. 3, although the imaging unit 18 is arranged on a line perpendicular to the surface direction of the laminate 5, and an image in plan view is obtained, the image obtained by the imaging unit 18 is not limited to an image in plan view, and may be an image in which the laminate 5 is captured in an oblique direction. Note that the light source 17 may be provided in the imaging unit 18, so as to have a device in which both units are integrated. Also, the image is not limited to an image in plan view of the laminate, and may be an image in cross-section of the laminate as will be described later.

The information processing device 19 loads, analyzes, and evaluates image data of the laminate 5 captured by the imaging unit 18. As the information processing device 19, an information processing device having computing functions and display functions can be adopted, and a general purpose personal computer can be adopted. In analysis by the information processing device 19, one or more characteristics of the laminate can be evaluated by detecting air-pocket corresponding regions in a two-dimensional image of the laminate 5, to obtain characteristic values related to the area of the detected air-pocket corresponding regions are obtained, based on the characteristic values. In this way, the quality of the laminate can be evaluated finally.

Figure 4:
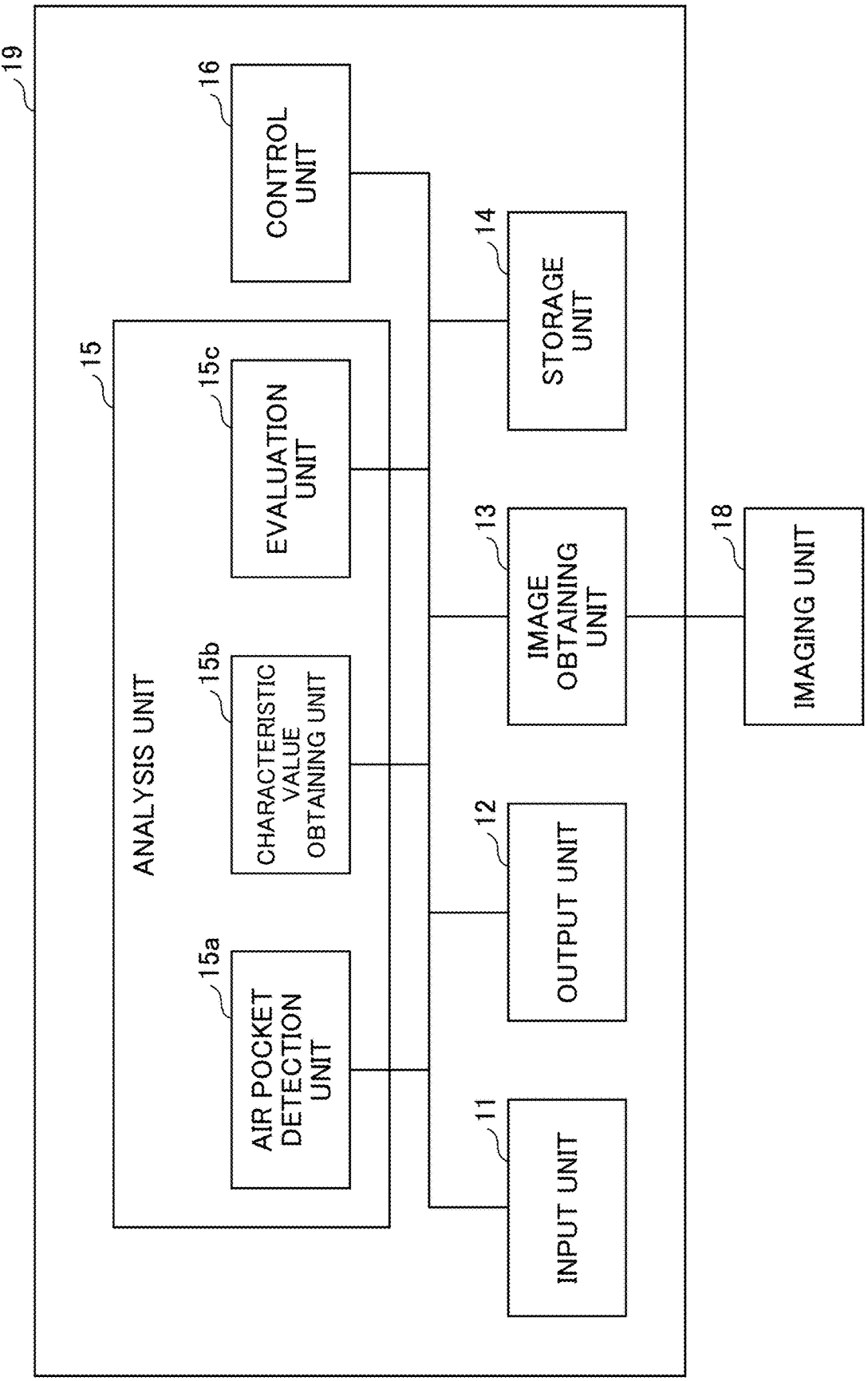
FIG. 4 is a functional configuration diagram of an evaluation device of laminates according to one embodiment of the present invention.

FIG. 4 illustrates an example of a functional configuration of the evaluation device 10 for carrying out the evaluation method according to the present embodiment. As illustrated in FIG. 4, the evaluation device 10 is configured to include an input unit 11, an output unit 12, an image obtaining unit 13 (image capturing unit), a storage unit 14, an analysis unit 15, and a control unit 16. The analysis unit 15 may be constituted with an air pocket detection unit 15a, a characteristic value obtaining unit 15b, and an evaluation unit 15c.

The input unit 11 receives inputs to start, end, and set various commands and the like related to image obtainment and image analysis from a user or the like. The input unit 11 can be an input interface such as a touch panel, keyboard, mouse, or may be an audio input device such as a microphone.

The output unit 12 outputs contents input via the input unit 11, and contents executed based on the input contents. The output unit 12 may be, for example, a display and/or a speaker.

The image obtaining unit 13 can load an image or image information captured by the imaging unit 18 described above. The image obtained by the image obtaining unit 13 may be a black-and-white image or may be a color image. The black-and-white image may be a grayscale image.

The storage unit 14 stores images obtained by the image obtaining unit 13, various items of data of analysis results and the like obtained by the air pocket detection unit 15a, the characteristic value obtaining unit 15b, and the evaluation unit 15c in the analysis unit 15. Also, as will be described later, in the case where the evaluation device 10 is connected to the bonding device 20 to constitute the manufacturing device 100 of laminates, the storage unit 14 may also store setting values related to the bonding conditions of the bonding device 20; the material and the thickness of the layers to be used; data related to the applications and the like of laminates to be obtained; values related to an allowable level and the like of the bond strength.

The air pocket detection unit 15a is a unit to execute image processing on a two-dimensional image of the laminate 5 obtained by the image, obtaining unit 13, to detect air-pocket corresponding regions. As described above, an air pocket present between the two layers of the laminate is a portion including gas such as air; therefore, the refractive index of light is different from that of the surrounding region, and the transmittance and the reflectance of light are also different. Therefore, in the obtained two-dimensional image, optical feature values of the air-pocket corresponding region are different from those in the surrounding region. Therefore, by measuring a distribution of optical feature values of the obtained two-dimensional image, air-pocket corresponding regions can be easily detected in the two-dimensional image.

Note that the air-pocket corresponding region may corresponds to a two-dimensional region occupied by an air pocket (a portion in which the base fabric is not bonded with the polymer layer) in the image, or may also be considered as a region that exhibits optical feature values significantly different from those in the surroundings due to the presence of an air pocket. For example, the air-pocket corresponding region may be a region that includes a two-dimensional region occupied by an air pocket and a surrounding region where the bond strength is weakened due to the presence of the air pocket, or may be a region in the two-dimensional region occupied by the air pocket that exhibits optical feature values significantly different from those in the surroundings.

The optical feature value described above may be, for example, a brightness value, a contrast value, and the like. Also, in the case of the obtained image being a color image, the feature value may be those related to a color space such as hue and chroma. It is favorable that the optical feature value is a brightness value, because a region occupied by an air pocket can be detected satisfactorily, and image processing can be easily executed.

Figure 5:
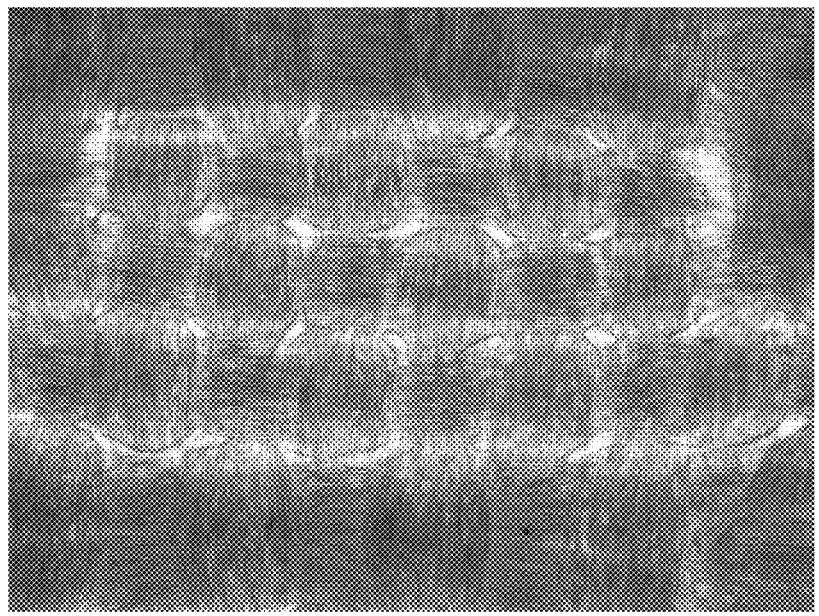
FIG. 5 is an example of an obtained two-dimensional image of a laminate.

FIG. 5 exemplifies an image obtained by the image obtaining unit 13. FIG. 5 is an image in plan view in which a laminate formed of the base fabric and the polymer layer bonded to each other is captured on the polymer layer side. The base fabric used in the laminate illustrated in FIG. 5 is a base fabric in which the warp and the weft as multiple bundles of single yarns are plain-woven, and air pockets are observed at positions at which the warp and the weft intersect.

The image processing by the air pocket detection unit 15a can be executed directly on an obtained image, or can be executed on an image converted from the obtained image into a predetermined format. For example, the obtained image may be first converted into a grayscale image.

With respect to the obtained image or the image converted from the obtained image into the predetermined format, in the air pocket detection unit 15a, a binarizing process can be applied with reference to a predetermined threshold. For example, in the case of obtaining a grayscale image represented in 8 bits to have 256 gradations (0 to 255), with a threshold value of 245, the binarizing process can convert pixels having a brightness value of less than or equal to 254 into black (brightness value of 0), and pixels having a brightness value of 255 to white (brightness value of 255), to generate a binarized image. In the case of using the evaluation device 10 as illustrated in FIG. 3, a white region in the binarized image described above can be an air-pocket corresponding region. Note that the threshold is not limited to the value described above, and can be selected depending on the thickness and the used material of the laminate as the object to be evaluated, the conditions upon capturing images, and the like.

Figure 6:
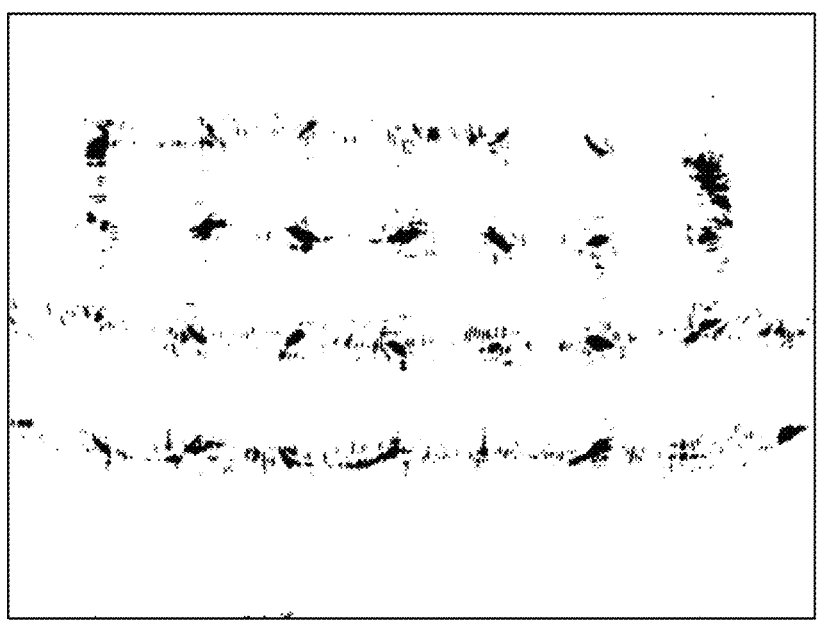
FIG. 6 is an example of a generated binarized image based on an obtained two-dimensional image.

Meanwhile, after the binarizing process described above, the black and white of the image can also be reversed. In this way, the air-pocket corresponding regions are displayed in black, and the other regions are displayed in white. FIG. 6 illustrates an image obtained by binarizing an obtained image, and then, further reversing black and white. In the example in FIG. 6, a black region corresponds to an air-pocket corresponding region.

Note that processes such as smoothing and sharpening including a gaussian filtering and a median filtering may be applied to the image, before or after the binarizing process. Also, the outlines can also be manually modified by visually observing and checking the air pockets.

The characteristic value obtaining unit 15b is a unit to determine a characteristic value that serves as an indicator of the bond strength, based on the air-pocket corresponding regions detected (extracted) by the air pocket detection unit 15a. The characteristic value may be a characteristic value related to the areas of the air-pocket corresponding regions. The characteristic value can be set as, for example, the ratio (%) of the total area $S_{AP}$ of the air-pocket corresponding regions with respect to the total area of the analyzed image $S_T$ ($S_{AP}/S_T \times 100$), and this ratio may be referred to as the void ratio (%). In the binarized image after reversal of black and white described above (FIG. 6), this void ratio is a ratio of the total area $S_B$ (%) of the black areas, with respect to the sum of the total area $S_W$ of the white areas and the total area $S_B$ of the black areas ($S_B/(S_W+S_B) \times 100$).

The characteristic value related to the areas of the air-pocket corresponding regions is not limited to the void ratio (%), and may be the total, maximum value, mean, or the like of the areas of the air-pocket corresponding regions, or may be a value that can be derived from a distribution of the areas of the air-pocket corresponding regions, such as the median value or the standard deviation.

The evaluation unit 15c can evaluate the laminate based on the characteristic value related to the air pockets obtained by the characteristic value obtaining unit 15b. More specifically, one or more characteristics of the laminate can be evaluated based on the characteristic value related to the areas of the air-pocket corresponding regions. In addition, the quality of the laminate can be evaluated by evaluating one or more of the characteristics of the laminate.

As described above, there are correlations between the characteristic value related to the areas of the air-pocket corresponding regions, and one or more characteristics of the laminate. Therefore, by using multiple existing laminates to determine a correlation between the two, one or more characteristics of the laminate as the object to be evaluated can be evaluated. For example, without changing the materials, thicknesses, and the like of the two layers as the materials of the laminate, multiple prototypes of the laminate are prepared under different conditions in the bonding step. In addition, for each prototype of the laminate, the characteristic value (the void ratio or the like) is determined as described above, and predetermined characteristics of each prototype of the laminate are determined, to determine the correlation between the two (to draw a calibration curve). Once such a correlation is determined, by analyzing a two-dimensional image of the laminate to be evaluated, the predetermined characteristics can be evaluated qualitatively or quantitatively.

In the case of evaluating the bond strength of the laminate, at a stage of determining the correlation described above, as the bond strength of a prototype of the laminate including predetermined two layers, the peel force may be measured with a conventional measurement method. From the determined correlation between the characteristic value and the peel force related to the areas of the air-pocket corresponding regions, the bond strength (peel force) can be estimated based on the correlation. Therefore, for a laminate whose bond strength is unknown, there is no need to measure the peel force by peeling, and hence, the laminate can be left unbroken.

In general, in a laminate formed of two layers bonded to each other, a smaller peel force results in a smaller pressure resistance. Therefore, measurement of the pressure resistance of the laminate can be used for evaluating the bond strength. The pressure resistance can be determined, for example, by fixing a laminate having a predetermined area to a measurement jig, applying pressure from the base fabric side of the laminate, and gradually increasing the pressure using a medium such as air or water, to measure the pressure when the laminate is broken (the pressure upon fracturing or the pressure upon fracturing (kPa)).

Also, the pressure resistance can also be measured, for example, as the retention of internal pressure. The retention of internal pressure can be calculated, as the attenuation rate or the like of the internal pressure, by arranging a laminate, for example, on a metal tube such that the laminate covers the pipe ends; fixing the laminate so as to make a space between the tube and the laminate dense with a flanged lid or the like; filling the pipe with gas and stopping the gas filling when the internal pressure becomes maximum, and after the maximum internal pressure is measured, measuring the internal pressure over time. The correlation between such an attenuation rate and the characteristic value related to the areas of the air-pocket corresponding regions in a two-dimensional image obtained as described above can be determined, to be used for evaluating the laminate.

Also, in the case where a laminate used for an airbag or the like has a bag shape as will be described later, the internal pressure retention characteristic of the bag-shaped laminate may be measured. For example, by setting the internal pressure of the bag-shaped laminate to a predetermined initial internal pressure $P_0$, and connecting a gas flow inlet to a gas pump or the like to flow gas from the gas flow inlet, the internal pressure $P_i$ of the bag-shaped laminate is measured by a pressure sensor attached in the vicinity of the gas flow inlet. After a predetermined period of time has elapsed, the percentage of the internal pressure $P_i$ of the bag-shaped laminate with respect to the initial internal pressure $P_0$ can be taken as the retention of internal pressure ($P_i/P_0 \times 100$). The correlation between such a retention of internal pressure and the characteristic value related to the areas of the air-pocket corresponding regions in a two-dimensional image obtained as described above can be determined, to be used for evaluating the laminate. By measuring the retention of internal pressure by the method described above, the characteristic corresponding to an actual use state can be measured, and hence, more practical evaluation of the bag-shaped laminate can be executed.

The correlation of the characteristic value described above and the characteristics of the laminate can be expressed in a graph or in a formula (model). The graph or the formula expressing the correlation can be stored in the storage unit 14. The formula expressing the correlation can be determined by executing regression analysis where the characteristic value related to the areas of the air-pocket corresponding regions is taken as the independent variable, and the characteristics of the laminate are taken as the dependent variables. In this case, multiple characteristic values may be taken as the independent variables, or a characteristic of the laminate other than the characteristic value (a physical property or the like of a material forming the laminate) may be taken as the independent variable. As will be discussed later, the characteristic value related to the areas of the air-pocket corresponding regions is the void ratio, and in the case where the characteristic of the laminate is the pressure resistance of the laminate (pressure upon fracturing, retention of internal pressure, or the like), the following relationship can be satisfied:

$$Y = \log X + b$$

where X represents the void ratio, and Y represents the pressure resistance.

However, the regression equation expressing the correlation between the characteristic value and the characteristic of the laminate is not limited to the one described above; depending on the layer structure of the laminate, and the type and dimensions of the material forming the laminate, a linear regression, an exponential regression, or the like can be used. Also, in the case of measuring two or more characteristics of the laminate, for example, in the case of determining both the pressure upon fracturing and the retention of internal pressure of the laminate, the two or more types of characteristics are taken as the independent variables to execute multiple regression analysis or the like, to determine the correlation related to the overall characteristics so as to make evaluation.

Note that in at least part of the processing executed by the air pocket detection unit 15a, the characteristic value obtaining unit 15b, and the evaluation unit 15c described above, for example, image processing software such as ImageJ can be used.

The control unit 16 controls the respective units 11 to 15 constituting the evaluation device 10. Also, as will be described later, in the case where the evaluation device 10 is connected to the bonding device 20 to constitute the manufacturing device 100 of laminates, the control unit 16 can also execute a function of feedback control of the bonding device 20.

Each of these units 11 to 16 can be created as a program executed by a computer, and by installing these programs on a general-purpose personal computer, server, or the like, the evaluation device 10 according to the present embodiment can be implemented.

One embodiment of the present invention may be a method of manufacturing a laminate to be formed of two or more layers bonded to each other. The manufacturing method includes bonding two or more layers, and evaluating the laminate in-line by the method of evaluating the laminate described above.

Also, one embodiment of the present invention is a device that manufactures a laminate to be formed of two or more layers bonded to each other, and includes a bonding device to form a laminate by bonding two or more layers where at least one of the layer is made of polymer, and a device to evaluate the laminate described above provided as the back-end of the bonding device.

With reference to FIG. 1 again, the method of manufacturing a laminate, and the manufacturing device 100 of laminates will be described. FIG. 1 illustrates the example of manufacturing the laminate 5 by bonding the base fabric 4 and the polymer layer 1. As illustrated in FIG. 1, the manufacturing device 100 of laminates is provided with the bonding device (laminator) 20 of laminates, and the evaluation device 10 of laminates provided as the back-end of this bonding device 20. It is often the case that the laminate 5 is conveyed by a conveyor unit such as a belt conveyor, and finally wound around a roll or the like. The evaluation device 10 can evaluate the bond strength of the laminate 5 being conveyed before being wound, namely, can evaluate the bond strength of the laminate 5 in-line.

The evaluation device 10 is provided with the imaging unit 18, and the imaging unit 18 can obtain a two-dimensional image of the laminate 5 while being conveyed. Data of the image captured by the imaging unit 18 is transmitted to the information processing device 19, to be analyzed as described above.

As described above, there are correlations between the air-pocket corresponding regions and one or more characteristics of the laminate (e.g., the bond strength); therefore, once a correlation is obtained in advance with respect to a laminate using a predetermined base fabric and a predetermined polymer layer, by obtaining an image of a laminate whose predetermined characteristic is unknown, the predetermined characteristic may be estimated. Therefore, as long as an image of a laminate on the manufacturing line can be captured, the laminate can be evaluated while being manufactured. In addition, by feeding back the evaluation results, an optimum laminate can be manufactured in accordance with the application, by changing conditions for bonding the base fabric and the polymer layer, namely, conditions of heating and/or pressurization, and the like.

For example, by setting in advance an allowable level of the bond strength in accordance with the application and storing the level, it becomes possible to determine whether or not the evaluation results by the evaluation unit 15c reaches the allowable level. In the case where the bond strength of the laminate while being manufactured does not reach the allowable level, a signal to change the driving conditions of the heater 22 and/or the pressurizing unit 23 can be transmitted to the control unit 16, to change the conditions.

In the example illustrated in FIG. 1, the evaluation device 10 is included in the manufacturing device 100 of laminates. However, the evaluation device 10 may also be configured not to be included in the manufacturing device 100 of laminates, but as an independent device, namely, a stand-alone device.

In the case of using such a stand-alone evaluation device, a laminate can be evaluated in a state of being out of the manufacturing line, namely, off-line, rather than on the manufacturing line. Such offline evaluation can be executed by, for example, cutting out a sample for evaluation (a piece of the laminate) from the laminate immediately after manufacturing and analyzing the sample. Alternatively, in the case of evaluating the laminate by using an image in plan view of the laminate, there is no need to cut out a sample, and part of the laminate can be analyzed. By the analysis executed by such a stand-alone evaluation device, the laminate immediately after manufacturing can be evaluated, or the manufacturing method can be evaluated (evaluation in terms of whether the manufacturing conditions and the like are appropriate). The analysis results of the evaluation can be stored in the evaluation device 10, specifically in the storage unit 14 as in the case of the evaluation device (FIG. 1) built into the manufacturing device 100 of laminates. On the basis of the stored analysis results or evaluation results, the user of the manufacturing device can change the conditions of the manufacturing device, while manufacturing laminates or upon operating the manufacturing device next time.

Also, in the case of using the stand-alone evaluation, device, it is also possible to evaluate not only a laminate immediately after manufacturing, but also a laminate after a certain period of time has elapsed since the laminate was manufactured, for example, a laminate stored or left as is for a predetermined period of time after manufacturing under predetermined conditions. In order to evaluate such a laminate, a sample for evaluation may be cut out from the laminate to analyze the sample, or the laminate may be analyzed as is without cutting out a sample. In either case, by comparing analysis results obtained by analyzing the laminate after a certain period of time has elapsed since the laminate was manufactured, with analysis results obtained by analyzing the laminate immediately after manufacturing, change in quality of the laminate due to the elapsed time can be evaluated.

Further, by using the stand-alone evaluation device, a laminate can also be evaluated after some or all of the steps of manufacturing a product (an airbag or the like) from the laminate, for example, cutting and the like has been applied. In this case, a laminate included in a manufactured product can be evaluated, or a laminate included in a product already used can also be evaluated. In the case where evaluating a laminate included in a product already used, by comparing analysis results obtained by analyzing the laminate before use, with analysis results obtained by analyzing the laminate used for a predetermined period of time and in predetermined conditions, change in quality of the laminate due to the use can be evaluated.

In the case where change in quality due to such an elapsed time or change in quality due to use is evaluated, evaluation results can be used for improving the storage method, the usage, and the like.

Even if the evaluation device is configured as a stand-alone device, the specific configuration of the evaluation device can be substantially the same as that described above with reference to FIGS. 1 to 4. However, the stand-alone evaluation device is free of limitations related to being built into the manufacturing device 100 (FIG. 1), and hence, more specific configurations of the evaluation device and the configuration of the evaluation method may include further variations.

For example, a two-dimensional image of a laminate obtained by the imaging unit 18 (FIGS. 3 and 4) in the evaluation device 10 can be not only an image in plan view, but also an image in cross-section of the laminate. In other words, the laminate can be cut along the thickness direction, to capture the cross section in an image. By using the image in cross-section, especially in the case where the laminate is configured to have a bag shape to be used for an airbag or the like, the structural portion (also referred to as the main body portion) and/or seamed portions (also referred to as the ends) that will be described later, particularly the seamed portions, of the bag-shaped laminate can be suitably and selectively evaluated. In the case of capturing an image in cross-section, the laminate 5 in FIG. 3 is replaced with a sample piece of the laminate thinly cut along the thickness direction. Note that the image in cross-section to be used may be an image captured in a direction perpendicular to the cross section, or an image of the cross section captured in an oblique direction may also be used.

The sample piece of the laminate for generating an image in cross-section can be captured by using the image magnifying unit 18*a* such as a microscope and the main body of the imaging unit 18*b* (FIG. 3). Although the method of cutting the laminate is not limited in particular, it is favorable to use a microtome, ultramicrotome, or the like. A thin slice can be prepared by cutting the sample piece. Also, the preprocess associated with cutting by using a microtome or the like, namely, the method of fixing the sample, is not limited, too; freezing, embedding using an epoxy resin, or the like can be used.

Note that upon obtaining a thinly-sliced sample, in the case where the laminate includes a textile base fabric, the direction of the cutting line that cuts the laminate in the thickness direction may be along either the direction of the warp yarns or the weft yarns that constitute the fabric, or may be in a direction that crosses both yarns.

Image processing can be applied to the obtained image in cross-section by the air pocket detection unit 15*a* (FIG. 4) as in the case of the image in plan view described above. In other words, the binarizing process can be applied to the image in cross-section after converted to a predetermined format, or directly to the obtained image in cross-section. In this way, air-pocket corresponding regions observed in cross section can be detected.

In the case of capturing an image in cross-section by using a microscope, the method of projecting light is not limited in particular. In substantially the same way as illustrated in FIG. 3 that illustrates obtainment of an image in plan view, the light source (light projection unit) 17 may be arranged on the side opposite to the imaging unit 18 or on the same side as the imaging unit 18, namely, on the lower side with respect to the sample flakes of the laminate. Also, upon capturing an image, a bright field method, a dark field method, or the like can be used.

Figure 10:
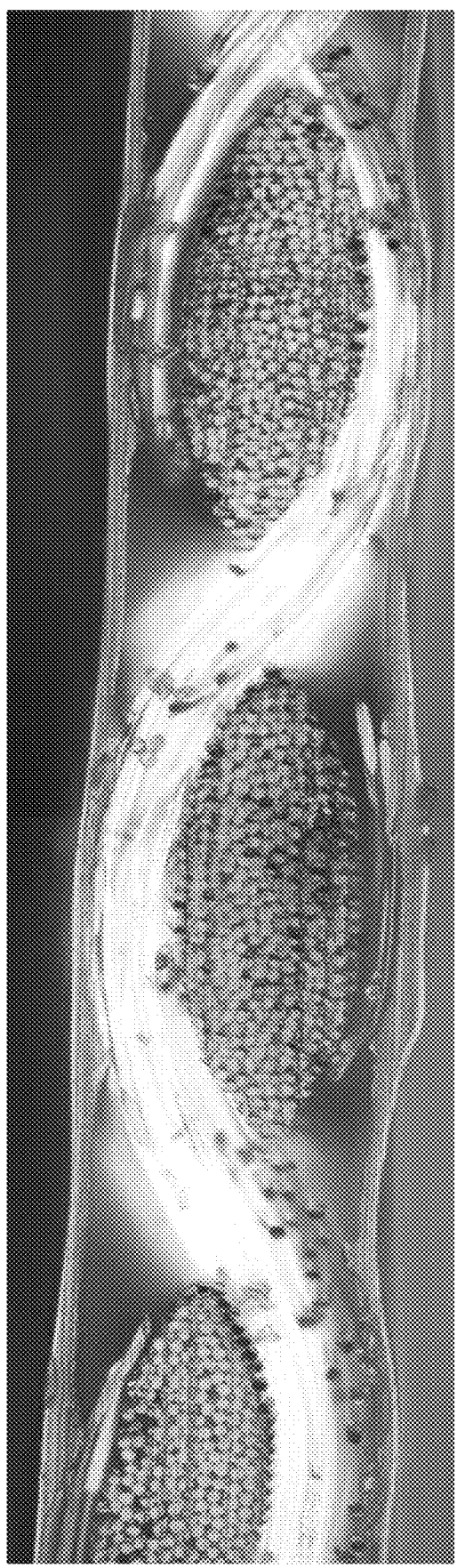
FIG. 10 is an image in cross-section of a laminate obtained in Example 4-1.

FIG. 10 illustrates an example of an image in cross-section that can be obtained by the imaging unit 18. FIG. 10 is an image in cross-section of the laminate in Example 4-1 that will be described later. This image in cross-section is an image of a thin slice cut out from a laminate formed to have a plain woven base fabric on which polymer layers are bonded on both surfaces, along a cutting line along one fiber direction by a cryomicrotome method (an image obtained by cutting in substantially the same way as in FIG. 2), captured by using a microscope (an image magnifying unit). Note that the image in FIG. 10 is an image observed and captured by a dark field method. As can be seen in FIG. 10, air pockets are imaged in black between the base fabric and the polymer layers, especially at the intersections of the warp and the weft.

Figure 11:
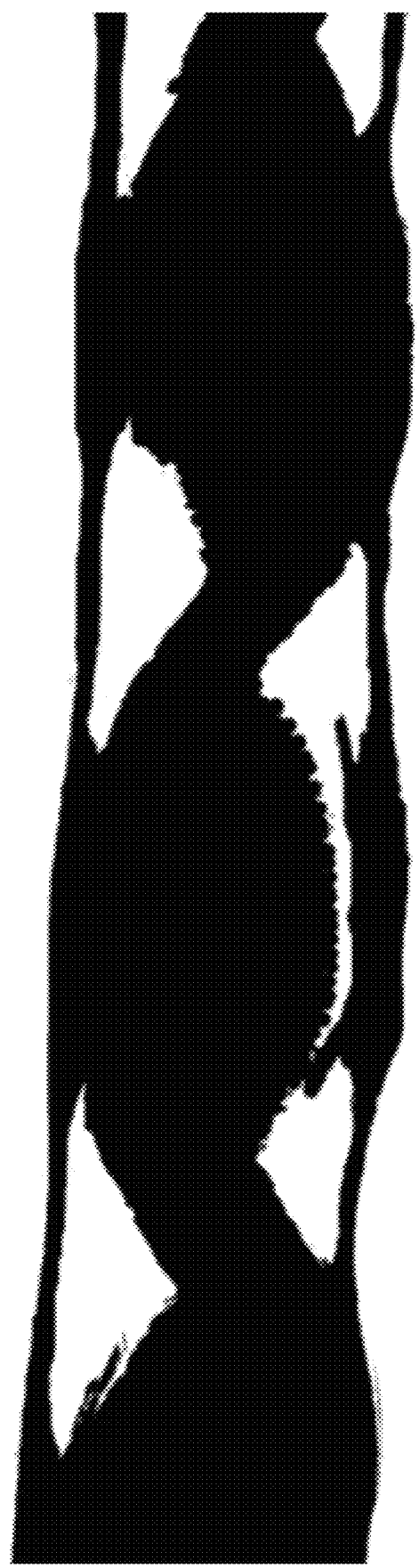
FIG. 11 is a binarized image generated based on the image in cross-section in FIG. 10.

FIG. 11 illustrates an example of an image in which the binarizing process is applied to the image in cross-section in FIG. 10 with reference to a predetermined threshold value, to reverse black and white of the image. In the binarized image illustrated in FIG. 11, the air-pocket corresponding regions imaged in black in FIG. 10 is illustrated in white, and exhibit optical features different from those of the other regions.

Even in the case of using an image in cross-section as in the present example, an indicator of the bond strength can be obtained from the binarized image (FIG. 10). Specifically, as in the case of using the image in plan view, by the characteristic value obtaining unit 15*b* (FIG. 4), a characteristic value related to the areas of the air-pocket corresponding regions such as the void ratio, can be determined. In addition, as in the case of using the image in plan view, by determining the correlation between the determined characteristic value and the bond strength, the bond strength of the laminate can be evaluated.

Note that the characteristic value related to the areas of the air-pocket corresponding regions obtained from an image in plan view, and the characteristic value related to the areas of the air-pocket corresponding regions obtained from an image in cross-section, may be combined to evaluate the laminate. In other words, with reference to a predetermined characteristic value obtained from an image in plan view, and a predetermined characteristic value obtained from an image in cross-section, evaluation may be made based on whether or not a criterion based on both characteristic values is satisfied. For example, in the case where the void ratio determined from the image in plan view is less than the predetermined value and the void ratio determined from the image in cross-section is less than the predetermined value, the quality can be determined as satisfactory. The predetermined value of the void ratio as a criterion for determination may be set such that, for example, as for the void ratio obtained from the image in plan view, a threshold of the void ratio at which a desired pressure upon fracturing is obtained is determined in advance, and as for the void ratio obtained from the image in cross-section, a threshold of the void ratio at which a desired retention of internal pressure is obtained is determined in advance. Further, in the case where the laminate is configured to have a bag shape, for example, in the case where one-piece woven is used as the base fabric, an image in plan view is obtained from the main body portion of the base fabric, and an image in cross-section is obtained from a seamed portion (described later) of the base fabric, and based on the respective images, the respective void ratios can be determined. By using such two criteria, the laminate can be evaluated more accurately.

Thus, the present embodiment is a method of evaluating a laminate formed of two or more layers bonded to each other, and may be a method including an image obtaining step of obtaining an image in plan view and an image in cross-section of the laminate; a detecting step of detecting air-pocket corresponding regions from the image in plan view and from the image in cross-section; a characteristic value obtaining step of obtaining characteristic values related to the areas of the air-pocket corresponding regions, from the image in plan view and from the image in cross-section; and an evaluation step of evaluating the laminate based on the respective characteristic values described above.

The laminate evaluated in the present embodiment has a sheet shape, and the shape includes, in addition to a flat shape, shapes formed to be tubular, bag-shaped, and balloon-shaped. Therefore, the laminate bonded and conveyed in the bonding device 20 as illustrated in FIG. 1 may be in a state of multiple laminates being overlaid one over another. Even in such a case, by obtaining an image under the same conditions and applying the image processing, a correlation between the presence of the air-pocket corresponding regions of the laminate and a predetermined characteristic of the laminate (e.g., the bond strength) can be determined as described above.

Also, by using the evaluation method of laminates described above, evaluation of a laminate formed to have two layers bonded to each other and to have another layer arranged can also be executed satisfactorily. For example, the strength of the entire laminate can be evaluated for a laminate formed to have a base fabric on which polymer layers are bonded on both surfaces.

In the case where one of the two layers constituting the laminate is a base fabric, it is favorable that the base fabric is a textile because of its high mechanical strength. If the fabric is a textile, a biaxial structure may be adopted in which multiple warp yarns and multiple weft yarns are combined, or a triaxial structure may be adopted in which multiple warp yarns, multiple weft yarns, and multiple oblique yarns are combined. Also, in the case where the textile has a biaxial structure, although the textile may be of plain weave, twill weave, satin weave, or the like, it is more favorable that the textile is of plain weave because of its strength and ease of manufacturing. Also, the base fabric also includes one-piece woven (OPW) formed to have a seamless bag shape, so as to allow the base fabric to have a curved surface in accordance with the three dimensional shape of an intended product, instead of a planar base fabric.

Note that in the case where the laminate has a bag shape to be used for an airbag or the like, it is favorable that the base fabric included in the laminate is one-piece woven because a highly airtight product can be obtained. In the case of using a one-piece woven, bag-shaped base fabric, the base fabric is prepared, and polymer layers are arranged on both sides of the bag-shaped base fabric. In other words, in a state of the bag being degassed to have the main body portion of the base fabric overlaid in two layers, the polymer layers are arranged on both sides of the base fabric. Then, at the edges of the base fabric, the polymer layers arranged on both sides are bonded. In this case, seamed portions (ends) may be formed at the edges of the base fabric. A seamed portion is a portion of the base fabric at which the weaving method is changed from the main body portion of the base fabric (the portion forming the bag body), and the portion exists as a single layer. Therefore, in a state of the bag being degassed, the laminate including the one-piece woven base fabric can include the main body portion on which the polymer layers are bonded on both sides of the two-layer part of the unbonded base fabric, and a seamed portion on which the polymer layers are bonded on both sides of the single-layer part of the base fabric. In the laminate having such a configuration, in some cases, it is difficult to obtain an image in plan view having a sufficient area in the vicinity of the edges of the base fabric, especially in the seamed portions; however, an image in cross-section can be easily obtained with a sufficient range. Therefore, in the case of obtaining a two-dimensional image of the laminate, by obtaining an image in cross-section and based on a characteristic value obtained from the obtained image to evaluate the laminate, the base fabric can be evaluated satisfactorily in terms of the bond strength between the layers of the laminate in the vicinity of the edges, particularly in the seamed portions.

The types of fibers included in the base fabric is not limited in particular; synthetic fiber, natural fiber, regenerated fiber, semisynthetic fiber, inorganic fiber, and combinations of these (including mixed fibers and mixed woven fabrics) can be used. Among these, a synthetic fiber, especially a polymer fiber is favorable. As the fiber, a composite fiber such as core sheath type fiber, side-by-side fiber, or split fiber can be used. In the case of the fiber being a polymer fiber, as the polymer, polyester fiber, polyamide fiber, aramid fiber, rayon fiber, ultrahigh molecular weight polyethylene fiber, sulfonic fiber, and polyether ketone fiber, and the like may be enumerated.

In the case of the base fabric being a textile, the base fabric may include two or more types of fibers, for example, as fibers used as yarns extending in different directions, fibers having different materials, finenesses, or cross sectional shapes can be used. For example, in the case where the base fabric has a biaxial structure including the warp and the weft, the warp and the weft can be made of different types of materials. In this case, at least one of the warp and the weft can be a polyester fiber.

The base fabric may be formed using yarns having a total fineness (single yarn fineness×the number of strand) of 100 to 700 dtex. Also, it is favorable that the single yarn fineness of the fiber used in the base fabric is 1 to 10 dtex. In the case of the base fabric being a plain woven textile, it is favorable that each of the warp and the weft has a weaving density of 5 to 30 pcs/cm². The base fabric may have a unit weight (weight per m²) around to 300 g/m².

In the case where one of the two layers constituting the laminate is a flexible polymer layer, the polymer used in the polymer layer may be resin, rubber, what-is-called elastomer, or the like. A thermoplastic material is favorable because it can be bonded to the base fabric by heat sealing. The polymer layer may be a single layer, or may be constituted with two or more layers. In the case where the polymer layer is constituted with two or more layers, the materials and thicknesses of the two or more layers may be the same or may be different from one another. Also, in the case of a configuration where two or more flexible polymer layers are bonded to the base fabric, it is favorable that the layer on the side to be bonded to the base fabric is formed of a thermoplastic material.

As the resin, one or more species from among polyester resin, polyamide resin, polyolefin resin, polystyrene resin, ethylene-vinyl acetate copolymers, and the like may be enumerated. These resins may be modified by acid or the like, depending on the layer structure, intended use, and the like.

As the polyolefin resin, linear low-density polyethylene (LLDPE), low-density polyethylene (LDPE), high-density polyethylene (HDPE), polypropylene, and the like may be enumerated. The polyolefin to be used may be modified by unsaturated carboxylic acid such as acrylic acid, maleic acid, or fumaric acid; a derivative of these such as anhydride; or the like.

As the elastomer, one or more species from among polyester elastomer, polyamide elastomer, polyolefin elastomer, polyurethane elastomer, polystyrene elastomer, polybutadiene elastomer, and the like can be enumerated.

As the thermoplastic material, thermoplastic polyester elastomer is favorable. In the case of the thermoplastic polyester elastomer, it is favorable that the elastomer includes, as a hard segment, polybutylene terephthalate, polyethylene terephthalate, polytrimethylene terephthalate, or polybutylene terephthalate; and includes, as a soft segment, aliphatic polyether and/or aliphatic polyester. Also, the thermoplastic polyester elastomer may be modified by unsaturated carboxylic acid such as acrylic acid, maleic acid, or fumaric acid; a derivative of these such as anhydride; or the like, in the presence of a radical generator.

The melting point of the polymer forming the polymer layer may be around 70 to 250° C. Note that the melting point of the polymer refers to a temperature at which, while increasing the temperature of the layer, the layer softens, molecules of the polymer in the layer start moving relatively, and the polymer exhibits fluidity. The melting point of the polymer can be set as a melting peak temperature measured by a differential scanning calorimeter.

Note that in the case where the polymer layer is formed to have multiple layers laminated, it is favorable that at least the polymer layer adhered to the base fabric is formed of a material having the melting point, and that the melting point is within the range described above.

Note that components other than the polymer may be added to the polymer layer. As the other components, additives such as pigment, filler material, antioxidant, antiblocking agent, anti-hydrolysis agent, and the like may be enumerated.

APPLICATION EXAMPLES

In the following, although the present invention will be described in more detail with application examples, the present invention is not limited to these application examples.

[I. Application Examples Using Images in Plan View]

In each of the following application examples, the same base fabric and the same polymer layer were used for preparing multiple laminates by changing the bonding temperature and the bonding rate (conveyance speed). In addition, while measuring the void ratio (ratio of air pockets) from an image in plan view of each laminate, the pressure resistance of each laminate was measured, and the correlation between the void ratio and the pressure resistance (pressure upon fracturing) was determined with respect to the laminates.

Example 1-1

A base fabric CL1 (made of polyester, the total fineness of each of the warp and the weft was 470 dtex, and the unit weight was 200 g/m$^2$) was prepared. Also, a film F1 (a multilayer film in which a polymer layer having a melting point of 170° C. was laminated with another polymer layer having a melting point of 125° C.) was prepared. Then, using a device that was substantially the same as the manufacturing device 100 of laminates described in FIG. 1, the base fabric CL1 and the film F1 were bonded by heating and pressurization in a state of one of the layers of the film F1 having a lower melting point being located on the base fabric CL1 side, to prepare the laminate. At this time, at a heating temperature of 150° C., by changing the bonding rate between 3 and 10 m/min, four laminates were prepared in total.

The prepared laminate was viewed in plan view by an observation magnification of 30 times, using a stereoscopic microscope (SMZ 1500 manufactured by Nikon Corporation), and the image was captured using a camera head. The image was loaded using a camera control unit (Digital Sight DS-L3, 2560×1920 pixels, manufactured by Nikon Corporation). The loaded image was converted to an 8-bit, 256-tone grayscale image by using image processing software (ImageJ). Further, after black and white were reversed, the image was converted to a binarized image with a brightness value of 254 as the threshold value (an image having brightness values less than or equal to 254 converted to black (brightness value of 0) and a brightness value of 255 as white).

In the image described above to which the binarizing process was applied, the area (%) of the black areas with respect to the entire image area, namely, (the total area $S_B$ of the black areas)/(the total area $S_B$ of black areas+the total area $S_W$ of white areas)×100 was calculated, and this value was set as the void ratio (%) as the existence ratio (%) of the air pockets.

Meanwhile, for the four laminates in total, pressure resistances were measured as pressure upon fracturing (kPa). The pressure resistance was measured as follows. Each laminate was cut into a 20-cm square, and fixed to a sample holder called FX3000 4H manufactured by Textest AG. Then, the pressure was increased at a rate of 120 kPa/min, and measured at a point of time when the laminate was damaged.

Figure 7:
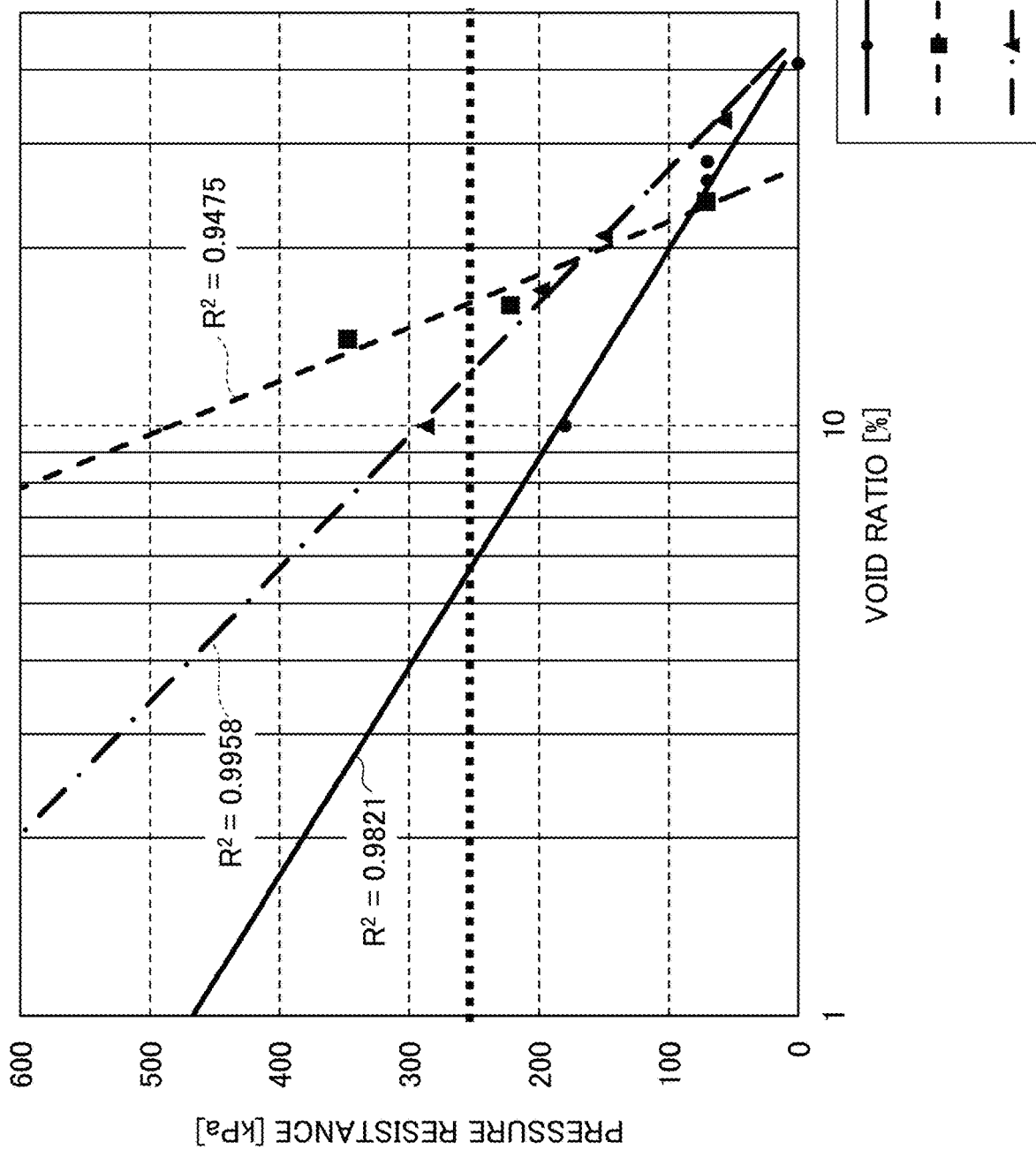
FIG. 7 is a graph illustrating a correlation between the void ratio and the bond strength with respect to Example 1-1 to Example 1-3.

The void ratios and the pressure resistances of the respective laminates were plotted on a semilog graph (FIG. 7). Note that in the graph in FIG. 7, a dotted line is drawn at positions at which the pressure resistance indicates 250 kPa, and this pressure resistance can be considered as an allowable level of the bond strength of the laminate. Therefore, in the case of manufacturing a laminate by the manufacturing device 100 as illustrated in FIG. 1, control of heating, pressurization, and the like can be executed with reference to the allowable level as shown in the graph illustrated in FIG. 7.

Example 1-2

Except that a film F2 (a multilayer film in which a polymer layer having a melting point of 209° C. was laminated with another polymer layer having a melting point of 149° C.) was used in place of the film F1, in substantially the same way as in Example 1-1, the base fabric CL1 and the film F2 were bonded to prepare laminates. At this time, by changing the bonding temperature between 170 and 180° C. and the bonding rate between 3 and 10 m/min, three laminates were prepared in total. Further, in substantially the same way as in Example 1-1, for each laminate, the void ratio and the pressure resistance (pressure upon fracturing) were determined and plotted on a semilog graph (FIG. 7).

Example 1-3

Except that a film F3 (a layer having a melting point of 209° C., a layer having a melting point of 150° C., and a layer having a melting point of 109° C. were laminated in this order, and every layer was a polymer layer) was used in place of the film F1, in substantially the same way as in Example 1-1, laminates were prepared. At this time, the film F3 was bonded with the base fabric CL1 in a state of a layer of the film F3 having a lowest melting point being located on the base fabric CL1 side. Also, by changing the bonding temperature between 170 and 180° C. and the bonding rate between 3 and 10 m/min, four laminates were prepared in total. Further, in substantially the same way as in Example 1-1, for each laminate, the void ratio and the pressure resistance (pressure upon fracturing) were determined and plotted on a semilog graph (FIG. 7).

Example 2-1

Figure 8:
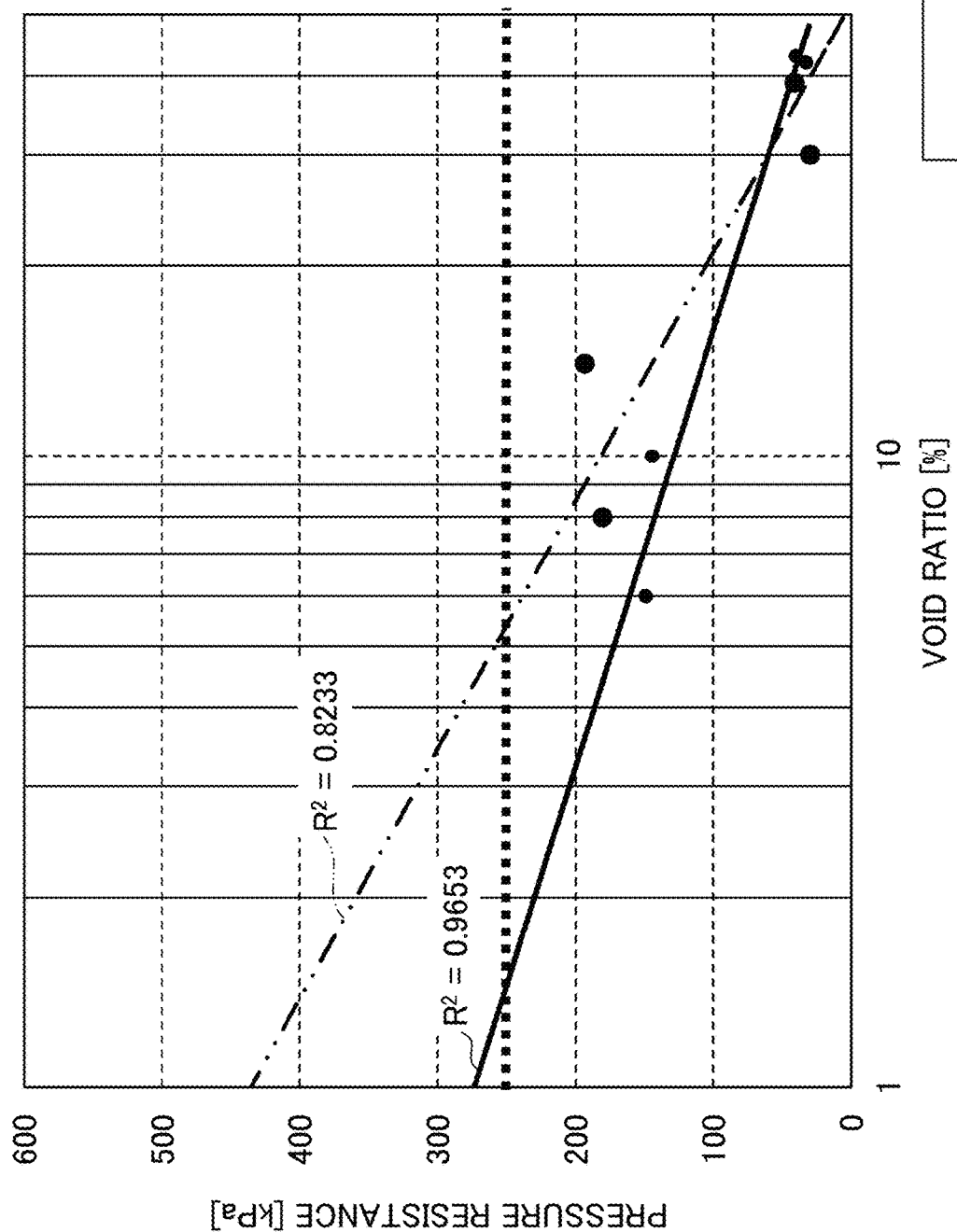
FIG. 8 is a graph illustrating correlations between the void ratio and the bond strength with respect to Example 2-1 to Example 2-2.

A base fabric CL2 (made of polyester, the total fineness of each of the warp and the weft was 470 dtex, and the unit weight was 200 g/m$^2$) was prepared. Also, the film F1 described above was prepared. In substantially the same way as in Example 1-1, by heating and pressurization, the base fabric CL2 and the film F1 were bonded to prepare laminates. At this time, by changing the bonding temperature between 170 and 180° C. and the bonding rate between 3 and 10 m/min, four laminates were prepared in total. Further, in substantially the same way as in Example 1-1, for each laminate, the void ratio and the pressure resistance (pressure upon fracturing) were determined and plotted on a semilog graph (FIG. 8).

Example 2-2

Except that the film F4 (a multilayer film in which a polymer layer having a melting point of 187° C. was laminated with another polymer layer having a melting point of 144° C.) described above was used in place of the film F1, in substantially the same way as in Example 2-1, four laminates were prepared in total. Further, in substantially the same way as in Example 2-1, for each laminate, the void ratio and the pressure resistance (pressure upon fracturing) were determined and plotted on a semilog graph (FIG. 8).

Example 3-1

A base fabric CL3 (made of polyester, the total fineness of each of the warp and the weft was 470 dtex, and the unit weight was 210 g/m$^2$) was prepared. Also, the film F2 was prepared. In substantially the same way as in Example 1-1, by heating and pressurization, the base fabric CL3 and the film F2 were bonded to prepare laminates. At this time, by changing the bonding temperature between 170 and 180° C. and the bonding rate between 3 and 10 m/min, four laminates were prepared in total. Further, in substantially the same way as in Example 1-1, for each laminate, the void ratio and the pressure resistance (pressure upon fracturing) were determined and plotted on a semilog graph (FIG. 9).

Example 3-2

Except that the film F3 described above was used in place of the film F2, in substantially the same way as in Example 3-1, four laminates were prepared in total. Further, in substantially the same way as in Example 3-1, for each laminate, the void ratio and the pressure resistance (pressure upon fracturing) were determined and plotted on a semilog graph (FIG. 9).

Figure 9:
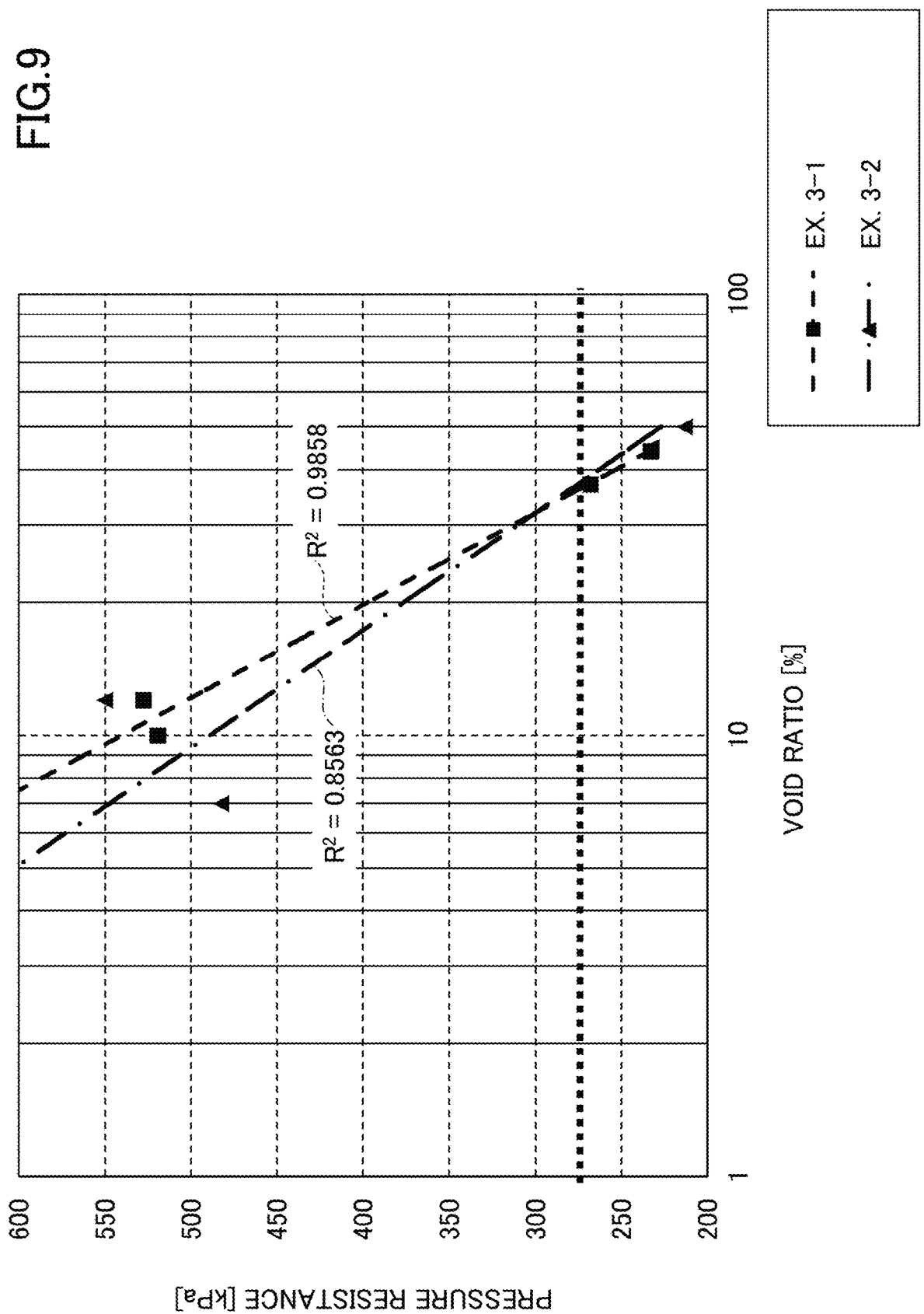
FIG. 9 is a graph illustrating correlations between the void ratio and the bond strength with respect to Example 3-1 to Example 3-2.

From FIGS. 7 to 9, for the laminates using the designated base fabrics and the designated polymer layers, good correlations were found between the void ratio and the pressure resistance (bond strength). Based on such correlations, the bond strength of the laminates can be evaluated accurately and simply.

[II. Application Examples Using Images in Cross-section]

The same base fabrics and the same polymer layers were used for preparing laminates by changing the bonding rate. In addition, while measuring the void ratio (ratio of air pockets) from an image in cross-section of each laminate, the pressure resistance of each laminate was determined as the retention of internal pressure.

Example 4-1

The base fabric CL1 (in this example, a one-piece woven airbag woven to have a bag shape) and the film F3 were prepared. The base fabric CL1 was spread in a flat shape (in a state of two layers of the bag-shaped base fabric being overlaid), the film F3 was arranged on both sides of the base fabric CL1, so as to have a layer among the multiple layers of the film F3 having a lower melting point located on the base fabric CL1 side, and then, by heating and pressurization executed by the bonding device 20 in FIG. 1, a laminate was prepared in which the base fabric CL1 was sandwiched between two film of F3 (the film F3 was bonded on the outer surface of the bag-shaped base fabric CL1). Upon bonding, the temperature was 175° C., and the bonding rate was 2.4 m/min. Note that the edges of the prepared laminate included a portion not including the base fabric CL1, and having layers of the film F3 directly bonded together.

Meanwhile, an image in cross-section of a seamed portion (end) of the base fabric CL1 was obtained. In other words, at the edge of the base fabric CL1, an image in cross-section was obtained from a portion of the base fabric at which the film F3 was bonded on both sides. More specifically, a thin slice cut along the thickness direction of the laminate was prepared by a cryomicrotome method. This thin slice was viewed by an observation magnification of 150 times, and captured by using a product called LV-100 manufactured by Nikon Corporation.

The image was loaded using a camera control unit (Digital Sight DS-L3, 2560×1920 pixels, manufactured by Nikon Corporation). The loaded image was converted to an 8-bit, 256-tone grayscale image by using image processing software (ImageJ). Further, after black and white were reversed, the image was converted to a binarized image with a brightness value of 254 as the threshold value (an image having brightness values less than or equal to 254 converted to black (brightness value of 0) and a brightness value of 255 as white).

In the image described above to which the binarizing process was applied, the area (%) of the black areas with respect to the entire image area, namely, (the total area $S_B$ of the black areas)/(total area $S_B$ of black areas+the total area $S_W$ of white areas)×100 was calculated, and this value was set as the void ratio (%) as the existence ratio (%) of the air pockets. In FIGS. 10 and 11, an image in cross-section in Example 4-1, and an image to which the binarizing process had been applied are shown, respectively.

Meanwhile, the retention of internal pressure of the laminate was determined. Specifically, a compressed gas generation device was plugged into the gas (air) inlet of the bag-shaped laminate to feed gas into the bag-shaped laminate, to have an initial internal pressure of 70 kPa. Thereafter, feeding of air was stopped, to measure the internal pressure of the laminate by a pressure sensor installed in the vicinity of the gas flow inlet. Then, the percentage (%) of the internal pressure after 6 seconds with respect to the initial internal pressure was determined, to be taken as the retention of internal pressure. The results are shown in Table 1.

Example 4-2

Figure 12:
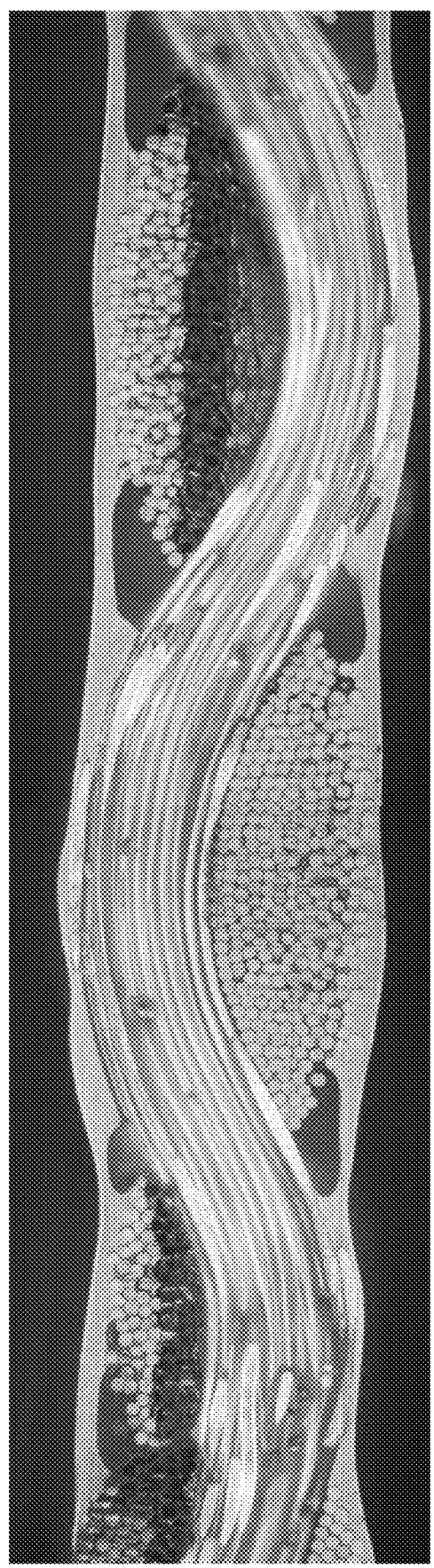
FIG. 12 is an image in cross-section of a laminate obtained in Example 4-2.
Figure 13:
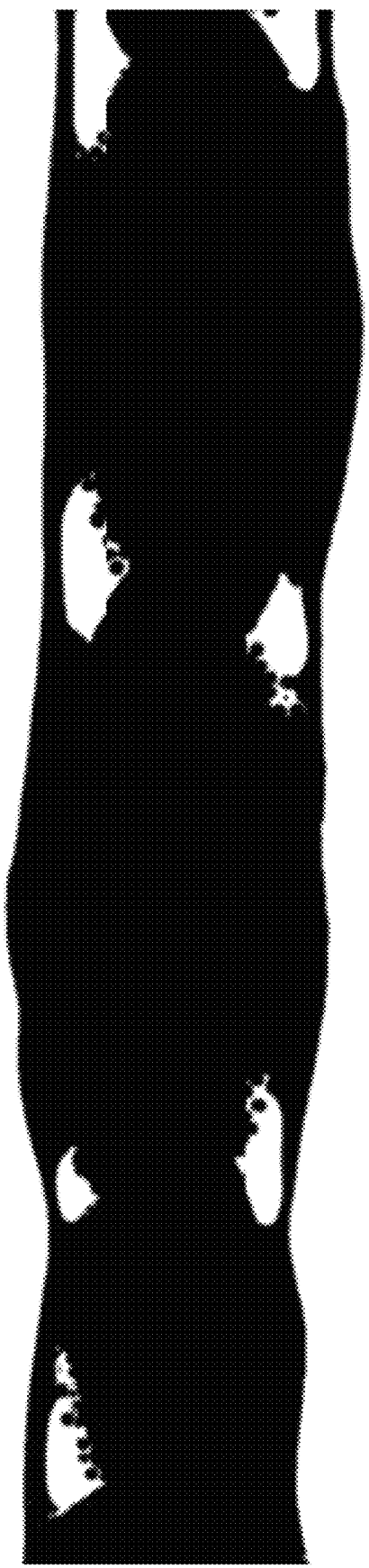
FIG. 13 is a binarized image generated based on the image in cross-section in FIG. 12.

In substantially the same way as in Example 4-1, a bag-shaped laminate formed of the base fabric CL1 and the film F3 was prepared, although the bonding rate was changed to 1.6 mm/min. Then, in substantially the same way as in Example 4-1, an image in cross-section of a seamed portion was obtained, and from the obtained image, a binarized image was further obtained. In FIGS. 12 and 13, an image in cross-section in Example 4-1, and an image to which the binarizing process had been applied are shown, respectively.

In substantially the same way as in Example 4-1, the void ratio was determined, and the retention of internal pressure was measured. The results are shown in Table 1.

TABLE 1

|  | EX. 4-1 | EX. 4-2 |
| --- | --- | --- |
| Void ratio | 20% | 7% |
| Internal pressure after 6 seconds | <40 kPa | 47.9 kPa |
| Internal pressure retention | <57% | 68% |

From Table 1, it was understood that the laminate in Example 4-2 having a relatively small void ratio has a greater retention of internal pressure than the laminate in Example 4-1 having a relatively great void ratio. Therefore, by capturing an image in cross-section of a laminate to obtain the void ratio by the evaluation device and the evaluation method according to the present embodiment, a tendency of the retention of internal pressure of the laminate in terms of greatness or smallness can be estimated, and subsequently, a tendency of the internal pressure retention characteristics or the bond strength in terms of greatness or smallness can be estimated and evaluated.

The present application claims priority based on Japanese Patent Application No. 2019-132201 filed on Jul. 17, 2019, to Japanese Patent Office, and the entire contents of which are incorporated herein by reference.

LIST OF REFERENCE NUMERALS

1 first layer (polymer layer)
4 second layer (base fabric)
5 laminate
10 evaluation device
11 input unit
12 output unit
13 image obtaining unit
14 storage unit
15 analysis unit
15a air pocket detection unit
15b characteristic value obtaining unit
15c evaluation unit
16 control unit
17 light source
18 imaging unit
18a image magnifying unit
18b main body of the imaging unit
19 information processing device
20 bonding device (laminator)
22 heating unit
23 pressurization unit
24 cooling unit
100 manufacturing device of laminates

The invention claimed is:

1. A method of evaluating a laminate formed of two or more layers bonded to each other, one layer from among the two or more layers being a base fabric, another layer being a flexible polymer layer bonded to the base fabric, the laminate being in a shape of a bag, the base fabric being one-piece woven, two base fabrics being joined together at respective ends to form the bag, the flexible polymer layer being arranged on an outside surface of the bag, the bag comprising a main body and a seam, the main body being a part that forms a space with the two base fabrics, and the seam being a part where the two base fabrics join together, the method comprising:
   obtaining two-dimensional images of the laminate, the two-dimensional images including a cross-sectional image along a thickness direction of the laminate and a plan view image of the laminate, the cross-sectional image being obtained from the seam, and the plan view image being obtained from the main body;
   detecting air-pocket corresponding regions from the plan view image and the cross-sectional image, respectively, the air-pocket corresponding regions being between the base fabric and the flexible polymer layer;
   determining a first characteristic value related to areas of the air-pocket corresponding regions based on the detected air-pocket corresponding regions from the plan view image and a second characteristic value related to areas of the air-pocket corresponding regions based on the detected air-pocket corresponding regions from the cross-sectional image;
   comparing the first and second characteristic values to a predetermined value; and
   evaluating an amount of air-pocket in the laminate based on the comparison result.

2. The method as claimed in claim 1, further comprising evaluating the laminate based on a correlation between the first characteristic value and the second characteristic value, and pressure resistance of the laminate.

3. The method as claimed in claim 1, further comprising detecting the air-pocket corresponding regions based on an optical feature value of the plan view image and the cross-sectional image.

4. The method as claimed in claim 3, wherein the optical feature value is a brightness value.

5. The method as claimed in claim 1, further comprising a binarizing process.

6. The method as claimed in claim 1, wherein at least one layer from among the two or 10 more layers is a flexible polymer layer.

7. A device that evaluates a laminate formed of two or more layers bonded to each other, one layer from among the two or more layers being a base fabric, another layer being a flexible polymer layer bonded to the base fabric, the laminate being in a shape of a bag, the base fabric being one-piece woven, two base fabrics being joined together at respective ends to form the bag, the flexible polymer layer being arranged on an outside surface of the bag, the bag comprising a main body and a seam, the main body being a part that forms a space with the two base fabrics, and the seam being a part where the two base fabrics join together, comprising circuitry configured to:
   obtain two-dimensional images of the laminate, the two-dimensional images including a cross-sectional image along a thickness direction of the laminate and a plan view image of the laminate, the cross-sectional image being obtained from the seam, and the plan view image being obtained from the main body;
   detect air-pocket corresponding regions from the plan view image and the cross-sectional image, respectively, the air-pocket corresponding regions being between the base fabric and the flexible polymer layer;
   determine a first characteristic value related to areas of the air-pocket corresponding regions based on the detected air-pocket corresponding regions from the plan view image and a second characteristic value related to areas of the air-pocket corresponding regions based on the detected air-pocket corresponding regions from the cross-sectional image;

comparing the first and second characteristic values to a predetermined value; and evaluate an amount of air-pocket in the laminate based on the comparison result.

8. A method of manufacturing a laminate to be formed of two or more layers bonded to each other, the method comprising:

forming the laminate by bonding two or more layers where at least one of the layer is made of polymer; and evaluating the laminate in-line by the method as claimed in claim 1.

9. The method as claimed in claim 8, the method further comprising:

feeding back a result of the evaluating, to change a condition of the bonding.

10. A device that manufactures a laminate to be formed of two or more layers bonded to each other, the device comprising:

a bonding device configured to form the laminate by bonding two or more layers where at least one of the layer is made of polymer; and the device as claimed in claim 7, provided as a back-end of the bonding device.

* * * * *